(12) United States Patent
Matsuoka (10) Patent No.: US 8,228,581 B2
(45) Date of Patent: Jul. 24, 2012

(54) SCANNING OPTICAL DEVICE (75) Inventor: Shohei Matsuoka, Tokyo (JP)

(73) Assignee: Prsym, Inc., San Jose, CA (US)

( * ) Notice: Subject to any disclaimer, the term of this patent is extended or adjusted under 35 U.S.C. 154(b) by 0 days.

(21) Appl. No.: 13/073,902

(22) Filed: Mar. 28, 2011

(65) Prior Publication Data

US 2011/0176192 A1    Jul. 21, 2011

Related U.S. Application Data

(63) Continuation-in-part of application No. PCT/JP2008/067451, filed on Sep. 26, 2008.

(51) Int. Cl.
*G02B 26/08* (2006.01)

(52) U.S. Cl. ............... 359/205.1; 359/201.1; 359/201.2; 359/204.1

(58) Field of Classification Search .... 359/196.1–226.2, 359/662; 347/225, 232–233, 241, 243–244, 347/256, 258–261
See application file for complete search history.

(56) References Cited

U.S. PATENT DOCUMENTS

| | | | |
|---|---|---|---|
| 4,861,983 A | | 8/1989 | Sasada et al. |
| 5,018,807 A | * | 5/1991 | Shirota ..................... 359/204.1 |
| 2004/0080799 A1 | | 4/2004 | Ishihara |
| 2005/0094231 A1 | | 5/2005 | Hubby, Jr. |

FOREIGN PATENT DOCUMENTS

| | | |
|---|---|---|
| EP | 0288970 A2 | 11/1988 |
| EP | 1528424 A1 | 5/2005 |
| JP | 1-163717 | 6/1989 |
| JP | 2004-138748 A | 5/2004 |
| JP | 2005-141217 A | 6/2005 |

OTHER PUBLICATIONS

International Search Report received for PCT Patent Application No. PCT/JP2008/067451, mailed on Oct. 21, 2008, 2 pages (1 page of English Translation and 1 page of International Search Report).

* cited by examiner

*Primary Examiner* — James Phan
(74) *Attorney, Agent, or Firm* — Patterson & Sheridan, LLP (57) ABSTRACT

A scanning optical device includes at least one light source unit for emitting a light beam, a first deflector for deflecting the emitted light beam in an auxiliary scanning direction, a condensing optical system for generating an intermediate image of the light beam deflected by the first deflector, a collecting optical system for condensing a light beam diverged from the generated intermediate image, a second deflector for deflecting the condensed light beam in a main-scanning direction, and a scanning optical system for scanning the surface to be scanned with the light beam deflected by the second deflector. The condensing optical system has an f-θ characteristic, the collecting optical system has an f-sin θ characteristic, and the scanning optical system has an f-sin θ characteristic.

8 Claims, 10 Drawing Sheets

SCANNING OPTICAL DEVICE

CROSS-REFERENCE TO RELATED APPLICATION

This application is a continuation-in-part of International Application No. PCT/JP2008/067451, filed Sep. 26, 2008. The disclosure of the prior application is incorporated herein by reference in its entirety for all purposes.

TECHNICAL FIELD

The present invention relates to a scanning optical device mounted in an image forming device such as a laser printer, a projector, or an image scanner. Specifically, the present invention relates to a two-dimensional scanning optical device such that a surface to be scanned does not move.

BACKGROUND

In a device such as a laser printer, a projector, or an image scanner, a two-dimensional scanning optical device for scanning a light beam irradiated from a light source on a surface to be scanned is mounted. Such type of a scanning optical system of the two-dimensional scanning optical device has an f-θ characteristic, and scans the light beam in a main scanning direction at a substantially constant speed without an unevenness in an intensity of light. Further, a scanning speed of the light beam in the auxiliary scanning direction is also substantially constant. Thus, intervals between scanning lines scanned on the surface to be scanned are kept at substantially equal intervals. On the other hand, in the two-dimensional scanning optical device, a problem arises such that the scanning lines are curved.

In order to overcome such a problem, a two-dimensional scanning optical device including a scanning optical system having an f-sin θ characteristic has been proposed, for example, in Japanese Patent Provisional Publication No. HEI01-163717A. When a scanning optical system is an optical system having the f-sin θ characteristic, the problem, in which the scanning lines are curved, does not arise.

However, when a scanning optical system of a two-dimensional scanning optical system has the f-sin θ characteristic, another problem arises in which intervals between scanning lines becomes narrower as they apart from a center of a scanning area on the surface to be scanned, since the f-sin θ characteristic has a negative distortion. In general, such a problem can be overcome by performing an electrical correction such as an image interpolation process or a driving speed control of a deflector.

However, intervals between scanning lines are not ultimately (optically) corrected by a correction based on the image interpolation process. Thus, a problem on an unevenness of light intensity or degradation of an image remains. Further, for a correction based on the driving speed control of the deflector, a driving system of a deflector becomes complicated and a processing load (processing time) of the driving control system increases. Thus, a problem arises in that, for example, a frame rate has to be reduced. Therefore, it is not preferable to correct the intervals between the scanning lines through an electrical process. In order to optically correct the intervals between the scanning lines, it can be considered to configure the scanning optical system with an anamorphic optical system, as disclosed, for example, in Japanese Patent Provisional Publication No. 2004-138748A. However, the anamorphic optical system has a shape which is rotationally asymmetric with respect to an optical axis. Therefore, a metal mold for the anamorphic optical system cannot be easily produced using a lathe. A special device such as a three-dimensional processing device is required for producing the metal mold. Thus, there is a problem such that a production cost increases.

SUMMARY

The present invention has been achieved through considering the above circumstances. Aspects of the present invention are advantageous in that they provide a scanning optical device having a configuration to reduce a production cost, the scanning optical device being able to scan in such a way that distances between scanning lines are equal, while removing curves of the scanning lines.

An optical scanning device according to a configuration of the present invention to overcome the above problems is a device which scans a light beam in two directions, that are a main scanning direction and an auxiliary scanning direction, on a surface to be scanned, and the device has the following features. Namely, such scanning optical device includes at least one light source unit for emitting the light beam, a first deflector for deflecting the emitted light beam in the auxiliary scanning direction, a condensing optical system that generates an intermediate image of the light beam deflected by the first deflector, a collecting optical system that collects each chief ray corresponding to each intermediate image formed by the condensing optical system, a second deflector for deflecting the condensed light beam in the main scanning direction, and a scanning optical system that scans the light beam deflected by the second deflector on the surface to be scanned. Further, the condensing optical system is configured to have an f-θ characteristic, the collecting optical system is configured to have an f-sin θ characteristic, and the scanning optical system is configured to have an f-sin θ characteristic, respectively. With such configuration, only the f-θ characteristic with respect to the auxiliary scanning direction remains for the light beam scanned on the surface to be scanned, and at the same time, only the f-sin θ characteristic with respect to the main scanning direction is given to the light beam scanned on the surface to be scanned. Therefore, scanning lines having no curves are scanned on the surface to be scanned in the auxiliary scanning direction while evenly spaced apart, without performing electrical corrections. Since each of the optical systems included in such optical system can be formed in a rotationally symmetrical shape, costs for metal molds are reduced and reduction of production costs can be achieved.

When the scanning optical system according to the present invention is configured to have a plurality of light source units, the plurality of light source units can be configured such that the plurality of light source units are arranged in line in at least one of the main scanning direction and the auxiliary scanning direction.

Further, when the plurality of light source units of the scanning optical device according to the present invention are configured such that three or more the light source units are arranged in line in the auxiliary scanning direction, the plurality of light source units can be arranged such that, for example, respective angles between optical axes of the neighboring two light source units become equal.

Further, it is preferable that the scanning optical device according to the present invention is configured so that the following conditional equation is satisfied, when the light source unit is arranged such that an optical axis of the light source unit makes an angle A with a central axis of the scanning optical system on a main scanning plane including the central axis of the scanning optical device and the main scanning direction, and when a maximum absolute value of an angle between the light beam deflected by the first deflector and the central axis on an auxiliary scanning plane including the central axis and the auxiliary scanning direction is defined as B, while a total number of scanning lines corresponding to one frame on the surface to be scanned is defined as N, in order to effectively avoid an unclear image having light and dark stripes being generated.

$$1 - \frac{0.25}{N} \leq \frac{\tan B}{B} \cdot \frac{\arctan\sqrt{\tan^2 B + \left(\frac{\tan A}{\cos B}\right)^2}}{\sqrt{\tan^2 B + \left(\frac{\tan A}{\cos B}\right)^2}} \leq 1 + \frac{0.25}{N}$$

It is preferable that deflection surfaces of the first deflector and the second deflector are arranged at optically conjugate positions by the condensing optical system and the collecting optical system, in order to suppress a loss on an optical amount.

Further, a scanning optical device according to another configuration of the present invention to overcome the above problems is a device for scanning a plurality of scanning lines on a surface to be scanned, and the scanning optical device has the following features. Namely, such scanning optical device includes a plurality of light source units for emitting light beams, the plurality of light source units being spaced evenly apart in an auxiliary scanning direction, the auxiliary scanning direction being perpendicular to a main scanning direction in which the scanning lines are scanned, a collecting optical system that collects chief rays of respective emitted light beams, a deflector that deflects the condensed respective light beams in the main scanning direction, and a scanning optical system that scans the light beams deflected by the deflector on the surface to be scanned. And, the collecting optical system is configured to have an f-sin θ characteristic and the scanning optical system is configured to have an f-sin θ characteristic, respectively.

Here, the plurality of light source units are, for example, an array light source having a plurality of light source units that are evenly spaced apart in the auxiliary scanning direction. There can be a plurality of array light sources. The plurality of array light sources can be, for example, arranged in line in the main scanning direction.

DETAILED DESCRIPTION OF EMBODIMENTS

Hereinafter, scanning optical devices of a first embodiment through a third embodiment of the present invention are explained with reference to figures.

Figure 1:
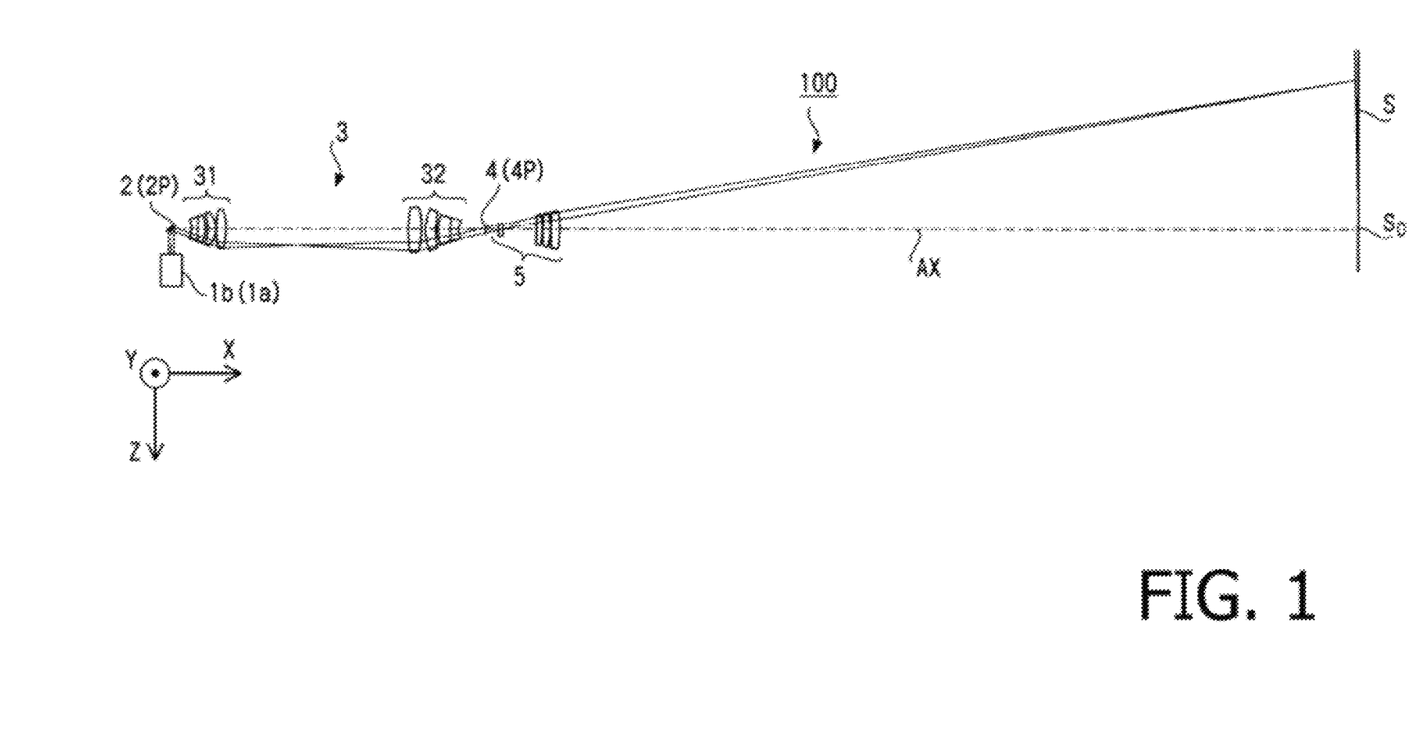
FIG. 1 is an auxiliary scanning sectional view schematically showing a configuration of a projector including a two-dimensional scanning optical device according to a first embodiment of the present invention.
Figure 2:
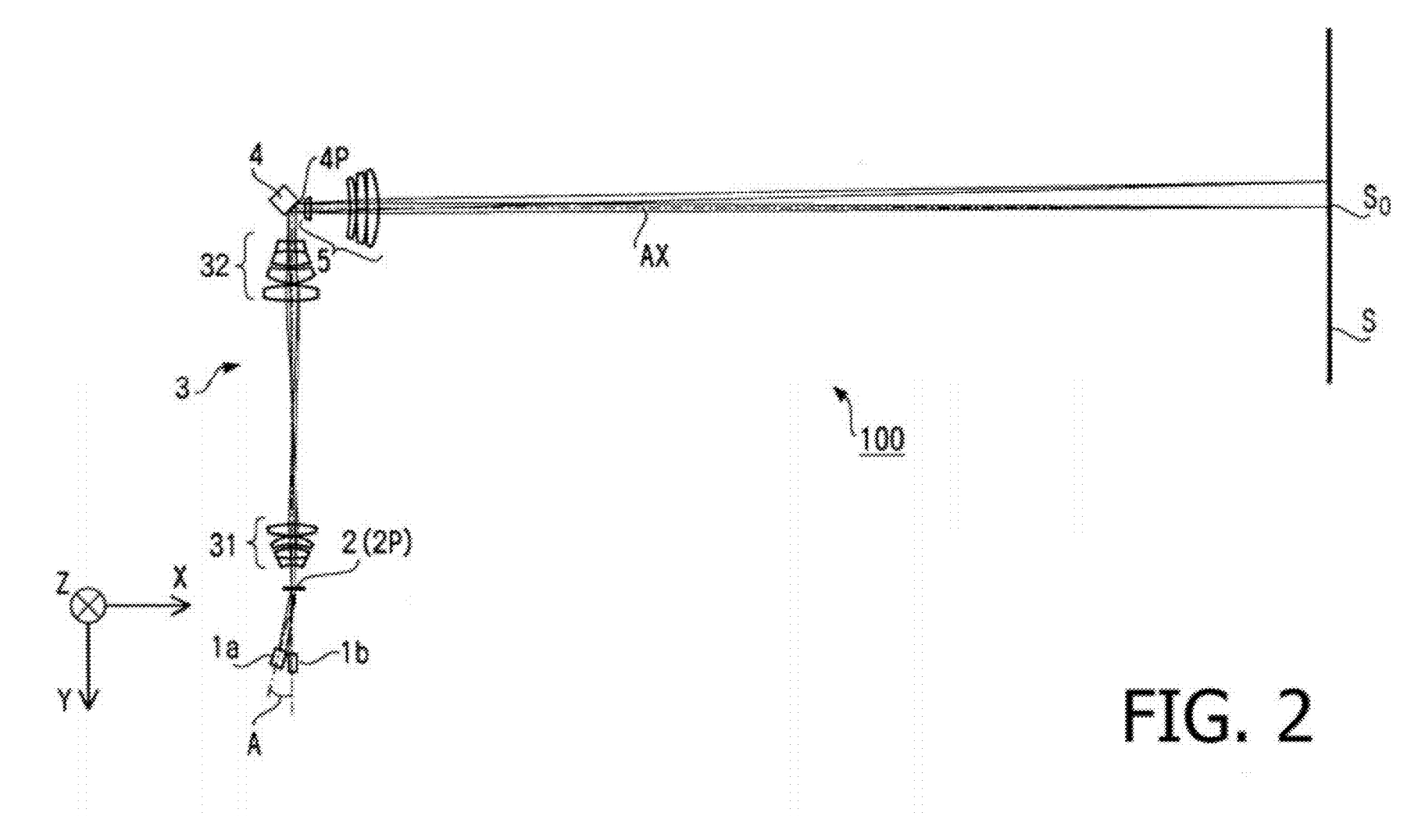
FIG. 2 is a main scanning sectional view schematically showing the configuration of the projector including the two-dimensional scanning optical device according to the first embodiment of the present invention.

FIG. 1 is a diagram schematically showing a configuration of a projector which is an example of a device in which a two-dimensional scanning optical device 100 of the first embodiment of the present invention is mounted. In this specification, a direction perpendicular to the paper surface in FIG. 1 is defined to be "a Y-direction," a first direction (a direction perpendicular to a surface to be scanned (a screen S) described below) parallel with the paper surface in FIG. 1 is defined to be "an X-direction," and a second direction (a direction parallel with the surface to be scanned) parallel with the paper surface and perpendicular to the first direction is defined to be "a Z-direction." Further, the Y-direction is defined to be "a main scanning direction" and the Z-direction is defined to be "an auxiliary scanning direction." A dashed line in FIG. 1 is a central axis (an optical axis) AX of the two-dimensional scanning optical device 100. In a state in which an optical path of the two-dimensional optical device 100 is spread out, a plane including the central axis AX of the two-dimensional scanning optical device 100 is defined to be "a main scanning plane," and a plane including the central axis AX and the auxiliary scanning direction is defined to be "an auxiliary scanning plane." According to the definition, FIG. 1 is an auxiliary scanning plane view schematically showing the configuration of the two-dimensional scanning optical device 100. In FIG. 2, further, a schematic configuration of a projector, which is an example of a device in which the two-dimensional scanning optical device 100 is mounted, is shown in a main scanning plane view.

As shown in FIG. 1 or FIG. 2, the two-dimensional scanning optical device 100 includes a plurality (here, two) of light source units 1 to irradiate laser beams. Each of the light source units 1 has the same configuration, and is arranged to line on the main scanning plane. For ease of explanation, on the main scanning plane, the light source unit which is arranged so that an optical axis makes an angle A with the central axis AX is designated with a symbol 1a, and the light source unit which is arranged so that an optical axis coincides with the central axis AX (namely, A=0) is designated with a symbol 1b, respectively. Here, the number of the light source units 1 is not limited to the number shown in the embodiment. The two-dimensional optical device 100 can be configured such that, for example, it has only one light source unit 1 or it has more than three light source units 1.

The two-dimensional scanning optical device 100 further includes, from the light source unit 1a (or 1b), a deflector for auxiliary scanning 2, a relay optical system 3, a deflector for main-scanning 4, a scanning optical system 5, and the screen S, in this order. For ease of explanation, a center of a scanned area on the screen S on which the laser beam is scanned (an intersection point where the screen S and the central axis AX intersect) is designated by a symbol $S_0$.

The respective light source units 1a and 1b irradiate laser beams modulated in accordance with image signals output from an image processing circuit, which is omitted in the figures. The laser beams irradiated from the light source units 1a and 1b enter a deflection surface 2P of the deflector for auxiliary scanning 2.

The deflector for auxiliary scanning 2 is a deflector (for example, a Galvano Mirror) configured such that the deflection surface 2P oscillates rapidly on the auxiliary scanning plane, and it scans the laser beam entered the deflection surface 2P in the auxiliary scanning direction with respect to the screen S. The laser beam entered the deflection surface 2P enters the relay optical system 3 while continuously deflected with an angle corresponding to a state of the oscillation by the deflection surface 2P.

The relay optical system 3 includes, from a side of the deflector for auxiliary scanning 2, a condensing optical system 31, and a collecting optical system 32, in this order. A laser beam entered the condensing optical system 31 enters a deflection surface 4P of the deflector for main-scanning 4 through the collecting optical system 32. Here, the laser beam entered the condensing optical system 31 once forms an intermediate image, after that the laser beam enters the collecting optical system 32. The condensing optical system 32 is substantially telecentric on a side of an image (on a side of an intermediate image), and the collecting optical system 32 is substantially telecentric on a side of an object (on a side of the intermediate image). Both of the condensing optical system 31 and the collecting optical system 32 includes a plurality of lenses. However, they can include single lenses, respectively.

The deflector for main-scanning 4 is a deflector (for example, a polygon minor) rotatably arranged on the main scanning plane, and it scans a laser beam entered the deflection surface 4P of the deflector for main-scanning 4 in the main scanning direction with respect to the screen S. The laser beam entered the deflection surface 4P enters a scanning optical system 5 while continuously deflected with angles corresponding to rotational states of the deflector for main-scanning 4.

Here, the deflector for auxiliary scanning 2 is arranged and configured such that an entrance pupil of the relay optical system 3 (the condensing optical system 31) substantially coincides with the deflection surface 2P of the deflector for auxiliary scanning 2. Additionally, the deflector for main-scanning is arranged and configured such that an exit pupil of the relay optical system 3 (the collecting optical system 32) substantially coincides with the deflection surface 4P of the deflector for main-scanning 4. Namely, the deflection surface 2P of the deflector for auxiliary scanning 2 and the deflection surface 4P of the deflector for main-scanning 4 are placed at optically conjugate positions by the relay optical system 3. By placing the positions of the entrance pupil and the exit pupil of the relay optical system 3 on the deflection surfaces of the respective deflector, the laser beam deflected by the deflection surface 2P enters the deflection surface 4P without exception. However, it is not required that the position of the entrance pupil and the position of the exit pupil exactly coincide with the deflection surfaces of the respective deflector. Optical performance of the two-dimensional scanning optical device 100 is not affected as long as the position of the entrance pupil and the position of the exit pupil substantially coincide with the deflection surfaces of the respective deflectors. As shown in FIG. 1, the light beam deflected in the auxiliary scanning direction is collected by the collecting optical system 32 such that chief rays of the light beams are collected on the central axis AX of the deflector for main-scanning 4.

The scanning optical system 5 includes a plurality of lenses. A laser beam injected from the scanning optical system 5 is scanned on the screen S.

The two-dimensional scanning optical device 100 is configured such that the deflector for auxiliary scanning 2 rotates by a predetermined amount every time the deflector for main-scanning 4 scans once in the main-scanning direction. The predetermined amount is defined to be an amount corresponding to a length which is equal to a number of laser beams aligned in the auxiliary scanning direction (in the first embodiment, since the light source units 1a and 1b are arranged on the main scanning plane, a number of the laser beams aligned in the auxiliary scanning direction is one), the laser beams being simultaneously used for scanning the screen S, times a spot size (a diameter of the spot in the auxiliary scanning direction). A two-dimensional image is formed on the screen S by repeatedly performing such scanning in the main-scanning direction while simultaneously performing scanning in the auxiliary scanning direction. Namely, unlike a rotatable photosensitive drum, the screen S, which is the surface to be scanned in the embodiment, is fixed with respect to the scanning optical system 5.

Problems with a scanning optical system in which an optical system has an f-θ characteristic or an f-sin θ characteristic have been described above. Namely, when the optical system in the scanning optical system has the f-θ characteristic, a problem arises in which a scanning line scanned on the surface to be scanned is curved. Further, when the optical system in the scanning optical system has a f-sin θ characteristic, a problem arises in which a distance between neighboring scanning lines becomes narrower as the neighboring scanning lines apart from a center of a scanned area (the center $S_0$ in the embodiment) on the surface to be scanned.

Figure 3:
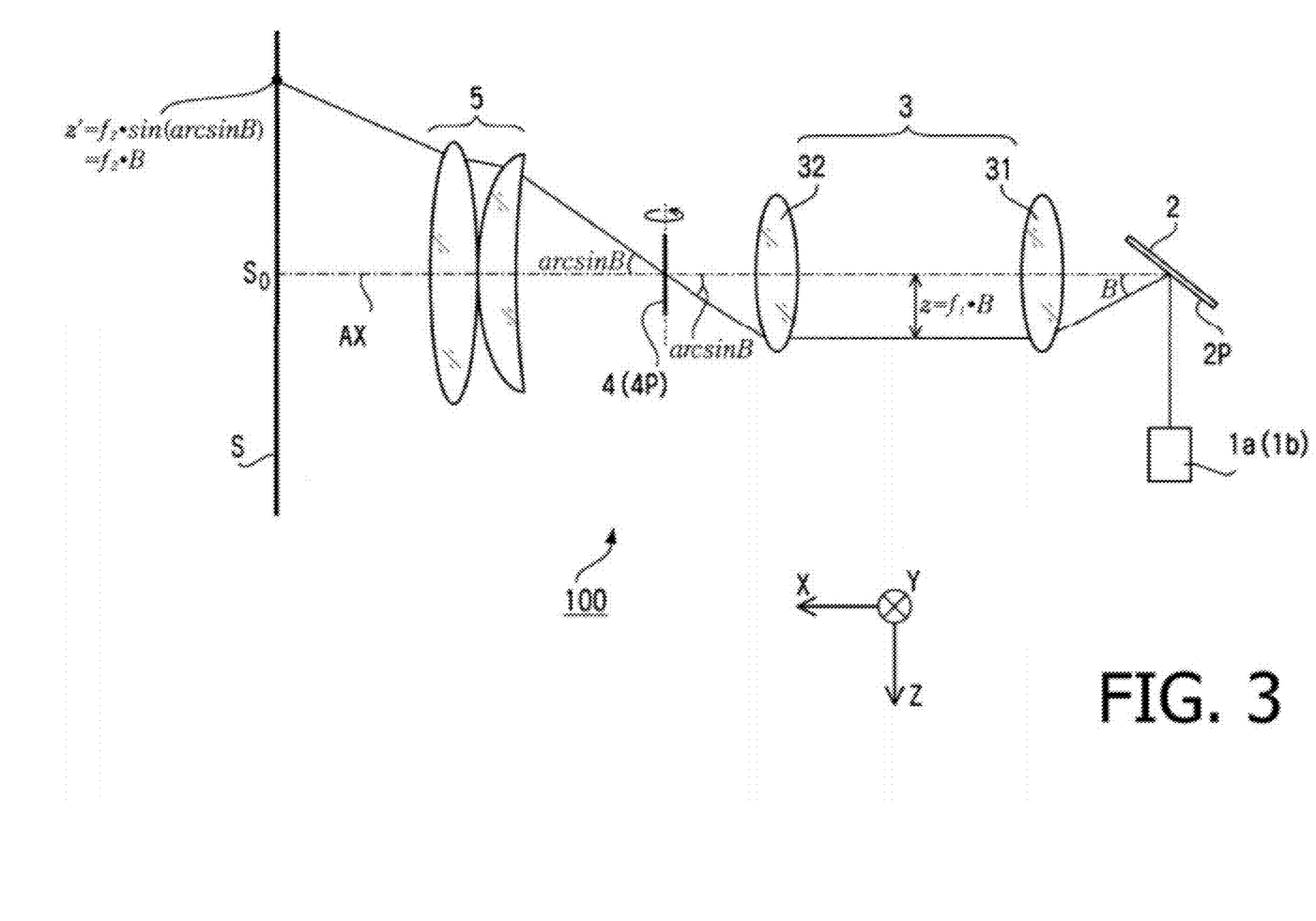
FIG. 3 is an auxiliary scanning sectional view schematically showing the configuration of the projector including the two-dimensional scanning optical device according to the first embodiment of the present invention.

To overcome such problems, the two-dimensional scanning optical device 100 has a characteristic configuration explained below. FIG. 3 is a diagram which more schematically shows the configuration of the two-dimensional scanning optical device 100 on the auxiliary scanning sectional view than FIG. 1, in order to explain the characteristic configuration of the two-dimensional scanning optical device 100. Further, in FIG. 3, for ease of an explanation of such a characteristic configuration, both the condensing optical system 31 and the collecting optical system 32 are simplified and shown as single lenses, respectively, and the scanning optical system 5 is simplified and shown as lenses including two lenses.

As shown in FIG. 3, an angle between a laser beam deflected by the deflector for auxiliary scanning 2 and the central axis AX on the auxiliary scanning plane is defined to be B. Further, both of focal distances of the condensing optical system 31 and the collecting optical system 32 are defined to be $f_1$, and focal distance of the scanning optical system 5 is defined to be $f_2$. Here, the focal distances of the condensing optical system 31 and the collecting optical system 32 are not necessary the same.

The condensing optical system 31 of the embodiment is configured to have the f-θ characteristic. Therefore, an image height z in the auxiliary scanning direction of the laser beam emitted from the condensing optical system 31 is $f_1 \cdot B$, which is proportional to the angle B. On the other hand, since a laser beam is not scanned in the main scanning direction, the f-θ characteristic is not given in the main scanning direction. Here, the image height explained in the embodiment is a value defined with respect to the central axis AX (or the center $S_0$) as a basis (=0), it can be separated and represented by two directional component, that are a component in the main scanning direction and a component in the auxiliary scanning direction.

The scanning optical system 5 is configured to have the f-sin θ characteristic so as to prevent the scanning line from curving. However, in such a configuration, the f-sin θ characteristic is also given for the auxiliary scanning direction, and which cause a problem in which distances between neighboring scanning lines are not kept equal.

Thus, in the embodiment, the collecting optical system 32 also is configured to have the f-sin θ characteristic. Therefore, a laser beam entered the collecting optical system 32 from the condensing optical system 31 is given the f-sin θ characteristic in the auxiliary scanning direction. Next, the laser beam enters the deflection surface 4P of the deflector for main-scanning 4 while making an angle (arc sin B) with the central axis AX on the auxiliary scanning plane. The laser beam is emitted from the deflection surface 4P of the deflector for auxiliary scanning 4 and enters the scanning optical system 5 while making the angle (arc sin B) with the central axis AX on the auxiliary scanning plane. An image height z' of the laser beam on the screen S in the auxiliary scanning direction is further given the f-sin θ characteristic by the scanning optical system 5, and becomes $f_2 \cdot \sin$ (arc sin B), namely, $f_2 \cdot B$, which is proportional to the angle B. Namely, in the auxiliary scanning direction, the f-sin θ characteristic of the laser beam is cancelled out, and only the f-θ characteristic remains. On the other hand, a laser beam entered the collecting optical system 32 is not scanned in the main scanning direction, the f-sin θ characteristic is not given in the main scanning direction at this stage. The laser beam is given the f-sin θ characteristic for the first time by the scanning optical system 5.

Namely, laser beams emitted from the light sources 1a, 1b scan on the screen S while being in states in which the respective laser beams are given the f-sin θ characteristic in the main scanning direction and the f-θ characteristic in the auxiliary scanning direction by the whole optical systems of the two-dimensional scanning optical device 100. Therefore, the scanning lines scanned on the screen S generate almost no curves and the distances between the neighboring scanning lines are kept substantially equal.

Figure 4A:
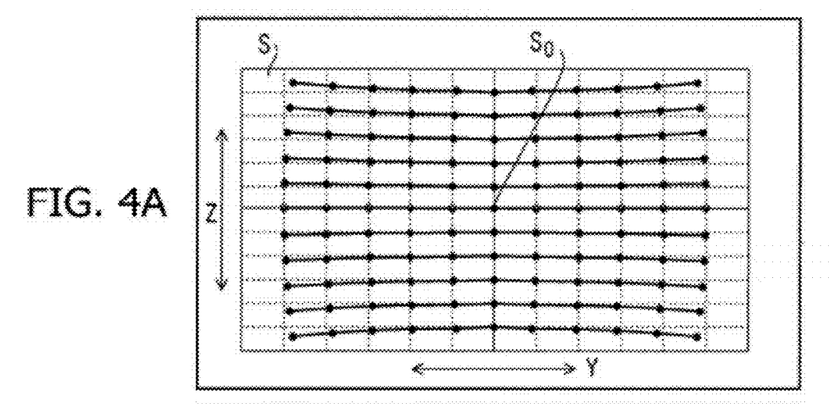
FIG. 4A is a diagram showing a trajectory of a scanning line drawn on a screen in a conventional two-dimensional scanning optical device in which a scanning optical system is composed of an optical system having an f-θ characteristic.
Figure 4B:
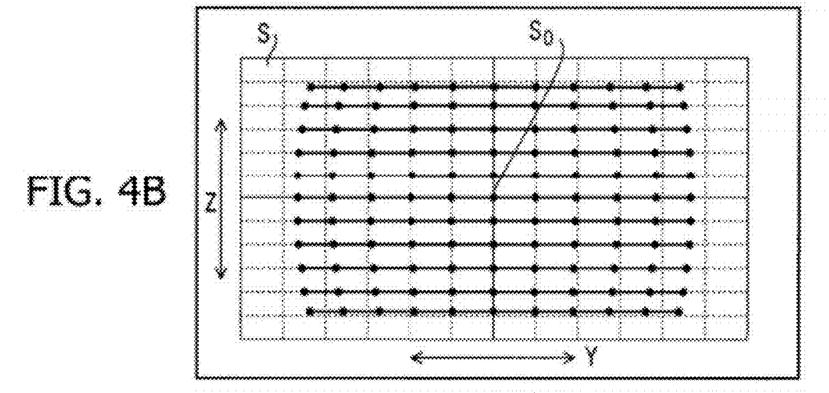
FIG. 4B is a diagram showing a trajectory of a scanning line drawn on a screen in a conventional two-dimensional scanning optical device in which a scanning optical system is composed of an optical system having an f-sin θ characteristic.
Figure 4C:
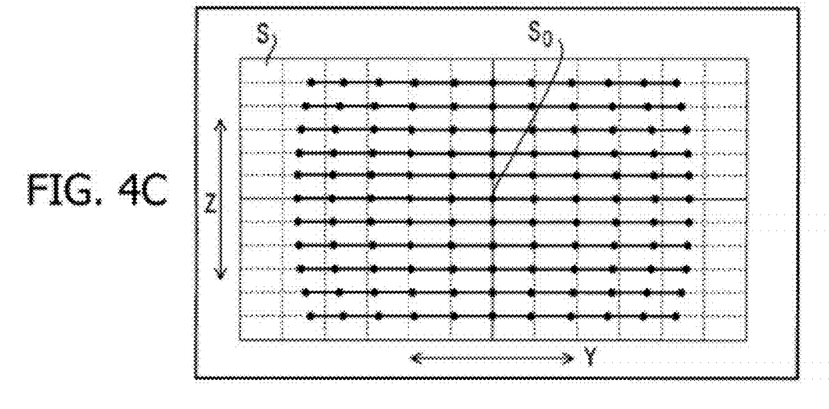
FIG. 4C is a diagram showing a trajectory of a scanning line drawn on a screen in the two-dimensional scanning optical device according to the first embodiment of the present invention.

FIG. 4A shows trajectories of scanning lines drawn on the screen S when a two-dimensional scanning optical device is a conventional device in which a scanning optical system includes an optical system having the f-θ characteristic. FIG. 4B shows trajectories of scanning lines drawn on the screen S when a two-dimensional scanning optical device is a conventional device in which a scanning optical system includes an optical system having the f-sin θ characteristic. FIG. 4C shows trajectories of scanning lines drawn on the screen S in the scanning optical device 100 of the embodiment. In the FIGS. 4A to 4C, the horizontal direction shows an image height in the main scanning direction, and the vertical direction shows an image height in the auxiliary scanning direction, respectively. And, dashed lines in the main scanning direction show ideal scanning positions in the respective scanning lines.

As shown in FIG. 4A or FIG. 4B, in the conventional two-dimensional scanning optical device, the problems arise in which the scanning lines curve and the distances between the neighboring scanning lines become narrower as they approach to the periphery of the scanned area. On the other hand, with reference to FIG. 4C, it can be seen that curves of the scanning lines are substantially removed and the distances between the neighboring scanning lines are kept substantially equal. Therefore, in the two-dimensional scanning optical device 100, a high quality image, in which a distortion or an unevenness are suppressed, is projected to the screen S.

The condensing optical system 31, the collecting optical system 32, and the scanning optical system 5 have rotationally symmetric shapes with respect to the optical axis. Namely, according to the embodiment, curves of the scanning lines can be removed and distances between neighboring scanning lines can be kept equal without having an optical system which is rotationally asymmetric with respect to the optical axis. Metal molds for each optical component can be produced using a lathe, without using a special apparatus such as a three-dimensional processing apparatus. Therefore, it has a merit such that costs for the metal molds can be suppressed to be a low level. The two-dimensional scanning optical device 100 is extremely advantageous with respect to producing costs.

Incidentally, when an image height y' of an intermediate image (hereinafter, written as "auxiliary scanning intermediate image height") generated by the condensing optical system 31 in the auxiliary scanning direction is constant, an angle between a laser light entered the deflector for main-scanning 4 and the central axis AX on the auxiliary scanning plane is constant, irrespective of an image height x' of the intermediate image in the main scanning direction (hereinafter, written as "main-scanning intermediate image height"). When such an angle is constant, distances between neighboring scanning lines scanned on the screen S becomes equal. In other words, in order to keep the distances between the neighboring scanning lines to be equal, it is necessary to keep the auxiliary scanning intermediate image height y' constant.

Figure 5:
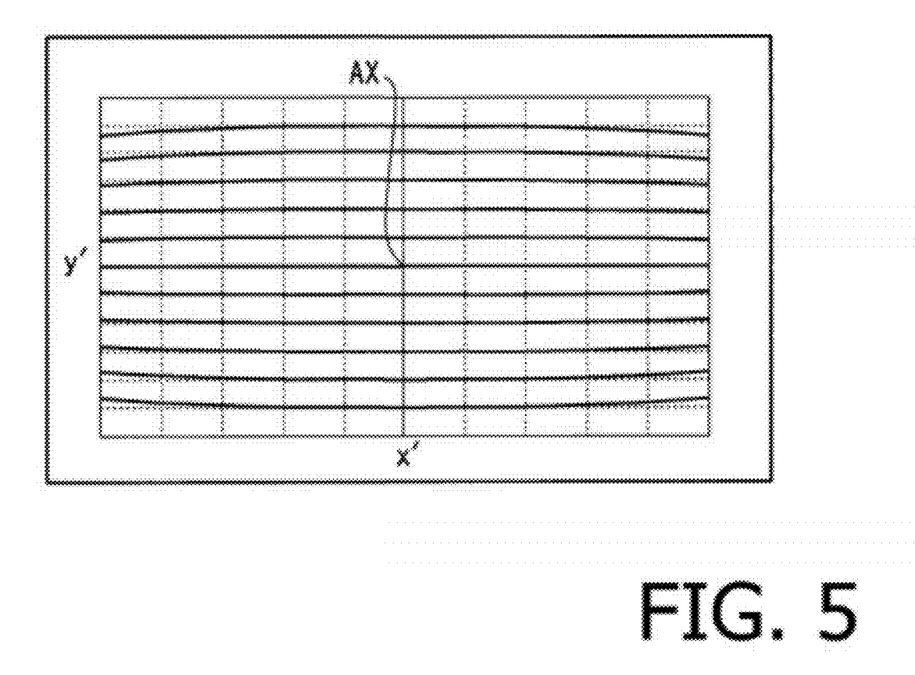
FIG. 5 is a pattern diagram showing an intermediate image produced with a condensing optical system included in the two-dimensional scanning optical system of the first embodiment of the present invention.

FIG. 5 is a pattern diagram showing an intermediate image generated by the condensing optical system 31. The horizontal direction in FIG. 5 shows the main-scanning intermediate image height x', and the vertical direction shows the auxiliary scanning intermediate image height y', respectively. FIG. 5 shows that the auxiliary scanning intermediate image height y' becomes lower (closer to the central axis AX), as the intermediate image is generated by an laser beam entered closer to a peripheral part in the main scanning direction of the condensing optical system 31.

Here, a laser beam emitted from the light source unit 1a is caused to enter the peripheral part in the main scanning direction of the condensing optical system 31 when the angle A in FIG. 1 is greater. Namely, the auxiliary scanning intermediate image height y' of the laser beam emitted from the light source unit 1a becomes lower as the angle A becomes greater. On the other hand, the angle A is 0 for a laser beam emitted from the light source unit 1b. Therefore, as the angle A of the laser beam emitted from the light source unit 1a becomes greater, a difference between the auxiliary scanning intermediate image height y' of the laser beam emitted from the light source unit 1a and the auxiliary scanning intermediate image height y' of the laser beam emitted from the light source unit 1b becomes greater.

Figure 6A:
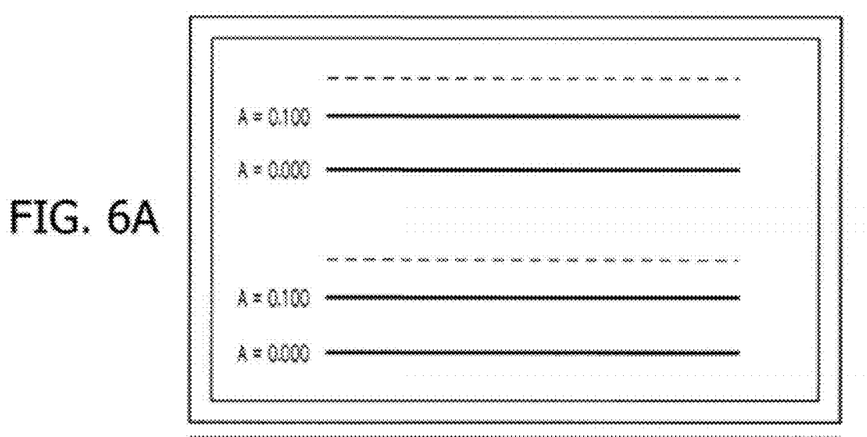
FIGS. 6A and 6B are diagrams each illustrating differences in image height of respective laser light beams emitted from different light sources.
Figure 6B:
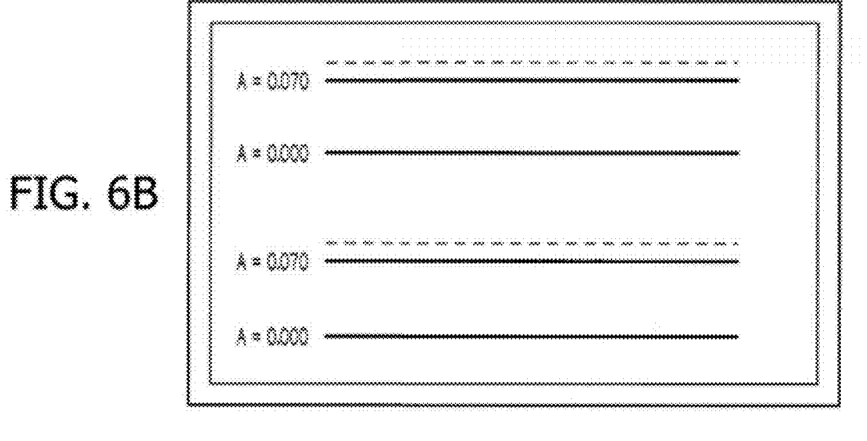

FIGS. 6A and 6B are diagrams illustrating such image height differences. In FIGS. 6A and 6B, solid lines of A=0.000 show scanning lines corresponding to laser beams emitted from the light source unit 1b. Solid lines of A=0.100 in FIG. 6A and solid lines of A=0.070 in FIG. 6B show scanning lines corresponding laser beams emitted from the light source unit 1a. Dashed lines in FIG. 6 show positions of ideal scanning lines. A=0.000, 0.070, and 0.100 show that the angle A is 0.000 (unit: rad), 0.070 (unit: rad), and 0.100 (unit: rad), respectively.

Since the angle A is 0 for the scanning lines corresponding to the laser beams emitted from the light source unit 1b, the auxiliary scanning intermediate image heights y' coincide with the ideal image heights (when all errors caused by optical components are not considered). Therefore, the scanning lines corresponding to the laser beams emitted from the light source unit 1b are overlapped with the dashed lines and shown. On the other hand, the auxiliary scanning intermediate image heights y' of the scanning lines corresponding to the laser beams emitted from the light source unit 1a are shifted from the ideal image heights, that is, they have image height differences from the auxiliary scanning intermediate image heights y' of the laser beams emitted from the light source unit 1b. Therefore, as shown in FIGS. 6A and 6B, the distances between the scanning lines corresponding to the laser beams emitted from the light source unit 1a and the scanning lines corresponding to the laser beams emitted from the light source unit 1b become uneven. When the distances between the scanning lines are uneven, an unclear image with light and dark stripes is projected on the screen S. Here, samples of stripe patterns projected on the screen S are shown in FIGS. 10A to 10D. FIGS. 10A, 10B, 10C, and 10D are diagrams corresponding to A=0.000 (rad), A=0.052 (rad), A=0.070 (rad), and A=0.100 (rad), respectively. As shown in respective diagrams of FIGS. 10A to 10D, the image projected on the screen S becomes unclearer image with more stronger light and dark stripes as the angle A becomes greater.

In order to ensure sharpness of a projected image, it is preferable to restrict the angle A. As shown in FIG. 6B, for example, when the angle A is restricted to 0.070 (rad), for the scanning light corresponding to the laser beam emitted from the light source unit 1a, the auxiliary scanning intermediate image height y' becomes closer to the ideal image height and the image height difference from the auxiliary scanning intermediate image height y' of the laser beam emitted from the light source unit 1b is reduced. Therefore, the differences between the scanning lines are even in comparison with the case of FIG. 6A.

Here, when a laser beam making an angle A with the central axis AX on the main scanning plane is deflected in a direction in which the laser beam makes an angle B with the central axis AX on the auxiliary scanning plane, a slope of the laser beam in the auxiliary scanning direction is defined as tan B, and a slope of the laser beam in the main-scanning direction is defined as tan A/cos B. With such definitions, an angle θ between the laser beam and the central axis AX is expressed by formula (1) below.

$$\theta = \arctan\left(\sqrt{\tan^2 B + \left(\frac{\tan A}{\cos B}\right)^2}\right) \quad (1)$$

When an image height of an intermediate image generated by the condensing optical system 31 is defined as H, the image height H and a auxiliary scanning intermediate image height y' are defined by formulas (2) and (3) below, respectively.

$$H = f \cdot \arctan\sqrt{\tan^2 B + \left(\frac{\tan A}{\cos B}\right)^2} \quad (2)$$

$$y' = H \cdot \frac{\tan B}{\tan \theta} = f \cdot \arctan\left(\sqrt{\tan^2 B + \left(\frac{\tan A}{\cos B}\right)^2}\right) \cdot \frac{\tan B}{\tan \theta} \quad (3)$$

On the other hand, when a laser beam which does not make the angle A with the central axis AX on the main scanning plane is deflected in a direction which makes the angle B with the central axis AX on the auxiliary scanning plane, a auxiliary scanning intermediate image height y', namely, an ideal image height (errors caused by optical components, etc., are not considered) is expressed by formula (4) below.

$$y' = f \cdot B \quad (4)$$

An error ratio of the auxiliary scanning intermediate image height y' of the laser beam emitted from the light source unit 1b with respect to the ideal auxiliary scanning image height y' is expressed by a value which is obtained by subtracting 1 from a value obtained by dividing formula (3) by formula (4). It is preferable that such a value is less than or equal to a ratio of a one-fourth of a width of the scanning line in the auxiliary scanning direction with respect to a length from an upper end to a lower end in the scanning area in the auxiliary scanning direction (=0.25/number N of all scanning lines scanned in 1 frame). Namely, it is preferable that the light source unit 1a is arranged so that the angle A satisfies conditional equation (5) below. When conditional equation (5) is satisfied, a sharp image without strong light and dark stripes is projected onto the screen S. On the other hand, when the vale is greater than the upper limit or the value is less than the lower limit, strong light and dark stripes appear on an image projected onto the screen S, and the image becomes extremely unclear.

$$1 - \frac{0.25}{N} \leq \frac{\tan B}{B} \cdot \frac{\arctan\sqrt{\tan^2 B + \left(\frac{\tan A}{\cos B}\right)^2}}{\sqrt{\tan^2 B + \left(\frac{\tan A}{\cos B}\right)^2}} \leq 1 + \frac{0.25}{N} \quad (5)$$

The following is a specific numerical configuration of a two-dimensional scanning optical device 100 of a first embodiment. Focal distances $f_1$ (unit: mm) of the condensing optical system 31 and the collecting optical system 32, a focal distance $f_2$ (unit: mm) of the scanning optical system 5, an angle A (unit: rad) between a laser beam entered the deflector for auxiliary scanning 2 (in other words, a light axis of the light source unit 1a) and the central axis AX on the main scanning plane, an angle B (unit: rad) between a laser beam deflected by the deflector for auxiliary scanning 2 and the central axis AX on the auxiliary scanning plane, and a number of scanning lines N (unit: line) are as follows:

$f_1$: 75
$f_2$: 600
A: 0.052 (or 2.979 (unit: deg))
B: 0.167 (or 9.549 (unit: deg))
N: 240

According to such a numerical configuration, the formula of the conditional equation (5) becomes 0.999098, and the upper limit and the lower limit become 1.001042 and 0.998958, respectively. Namely, the conditional equation (5) is satisfied. Thus a sharp image without strong light and dark stripes is projected onto the screen S.

Further, image height differences of respective laser beams emitted from different light source units have been prominently appeared in a conventional relay optical system having a symmetrical distortion characteristic. This is because an image, which depends on a characteristic of a rear group of lenses of the relay optical system, necessary for equalizing distances between neighboring scanning lines and an image, which depends on a characteristic of a front group of lenses of the relay optical system, actually generated are rotated by 90 degrees. In the embodiment, a distortion characteristic of the condensing optical system 31 and a distortion characteristic of the collecting optical system 32 are asymmetrical. Thus the image necessary and the image actually generated have closer characteristics in comparison with conventional ones. Therefore, a secondary effect is obtained with which image height differences are less likely occur, even if the angle A becomes greater.

The light source units of the first embodiment can be modified in accordance with each embodiment shown below. Hereinafter, only configurations and features unique to respective embodiments are explained, and for other configurations similar to the configurations of the first embodiment, the above description is referenced.

Figure 7:
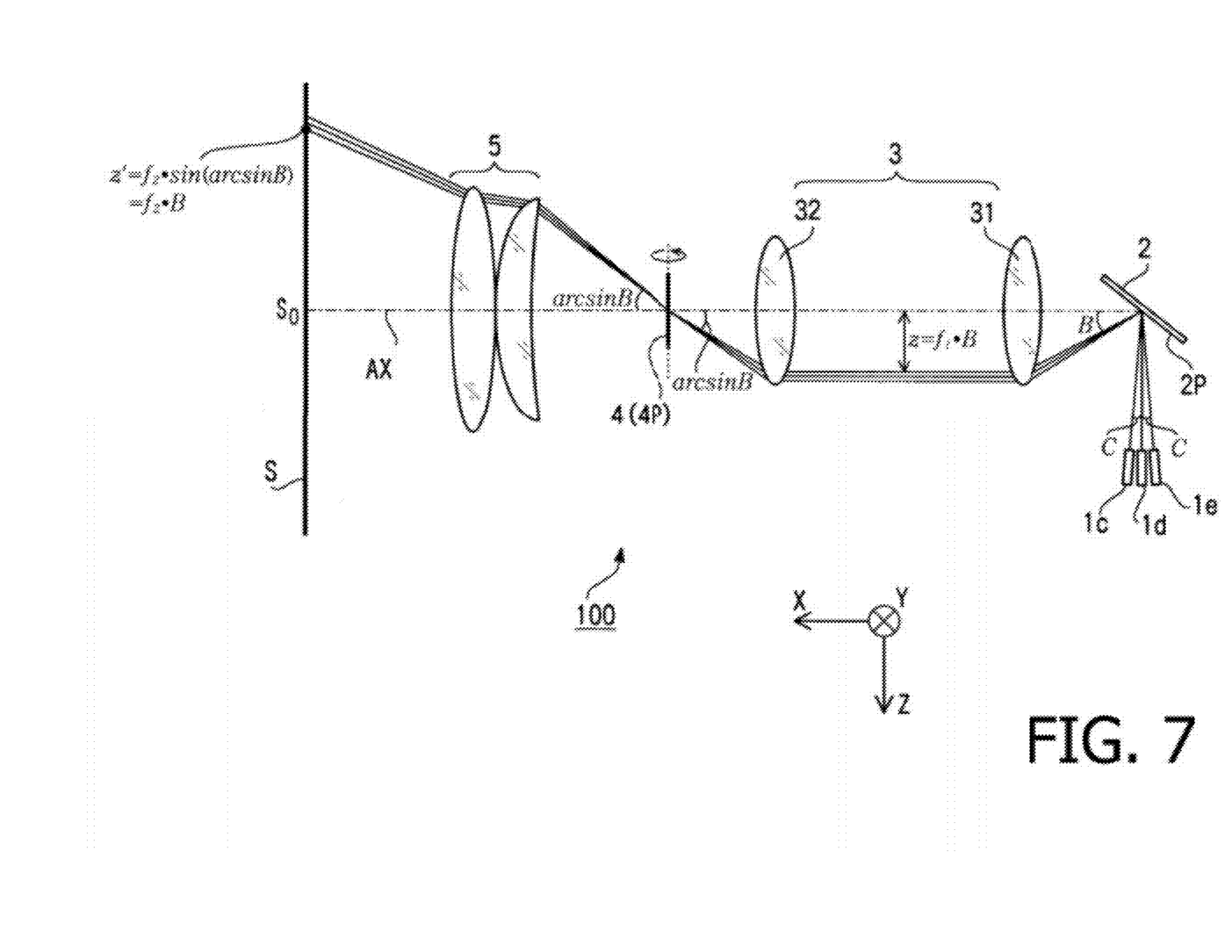
FIG. 7 is an auxiliary scanning sectional view schematically showing a configuration of a projector including a two-dimensional scanning optical device according to a second embodiment of the present invention.

FIG. 7 is an auxiliary scanning plane view illustrating a schematic configuration of a projector which is an example of a device in which a two-dimensional scanning optical device 100 of a second embodiment is mounted. Alternatively to the light source units 1a and 1b of the first embodiment, the two-dimensional scanning optical device 100 of the second embodiment has three light source units 1c, 1d, and 1e which are arranged in line in the auxiliary scanning direction.

The light source units 1c, 1d, and 1e are arranged such that they form equal angle distances on the auxiliary scanning plane, namely, an angle between (an optical axis of) the light source unit 1c and (an optical axis of) the light source unit 1d and an angle between (the optical axis of) the light source unit 1d and (an optical axis of) the light source unit 1e become almost equal (specifically, they both make an angle C). Further, the light source units 1c, 1d, and 1e are arranged such that each of the light axes makes the same angle A (for example, A=0) with the central axis AX on the main scanning plane. Alternatively, the light source units 1c, 1d, and 1e are arranged such that the angles A are different with each other, but all of them satisfy the conditional equation (5). Therefore, all of distances among scanning lines corresponding to laser beams emitted from the light source unit 1c, distances among scanning lines corresponding to laser beams emitted from the light source unit 1d, and the distances among scanning lines corresponding to laser beams emitted from the light source unit 1e are almost equal. Hence, distances between the neighboring scanning lines corresponding to laser beams emitted from each of the light sources are kept substantially equal, and a sharp image without strong light and dark stripes is projected onto the screen S. In this manner, the two-dimensional scanning optical device 100 of the second embodiment also has a configuration which reduces a production cost, similarly as the first embodiment. At the same time, the two-dimensional scanning optical device 100 of the second embodiment can scan in such a way that distances between the scanning lines are equal, while removing curves of the scanning lines.

Figure 8:
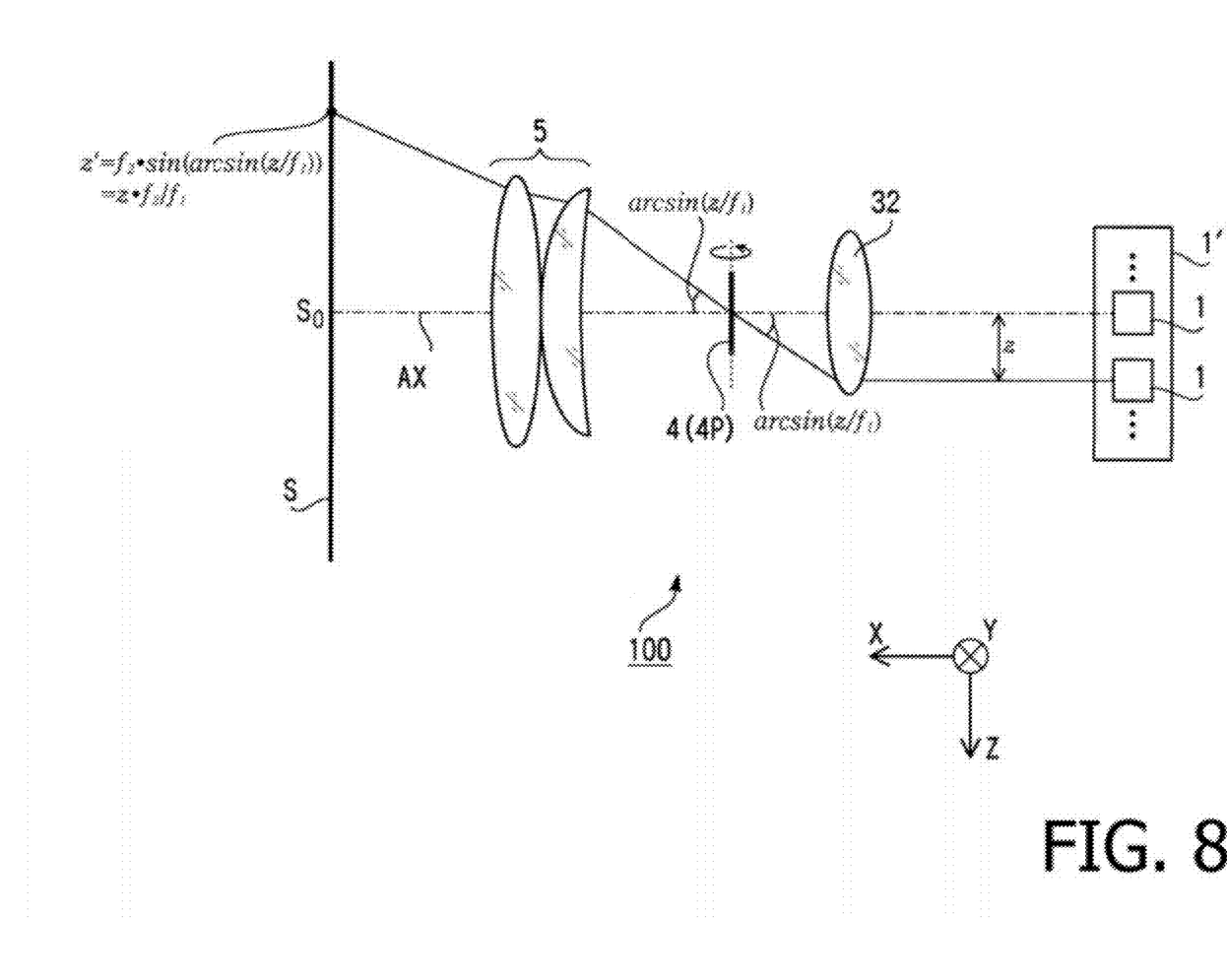
FIG. 8 is an auxiliary scanning sectional view schematically showing a configuration of a projector including a two-dimensional scanning optical device of a third embodiment of the present invention.

FIG. 8 is an auxiliary scanning plane view showing a schematic configuration of a projector which is an example of a device in which a two-dimensional scanning optical device 100 of a third embodiment is mounted. The two-dimensional scanning optical device 100 of the third embodiment is configured such that the light source unit 1, the deflector for auxiliary scanning 2, and the condensing optical system 31 are replaced by an array light source 1'. The array light source 1' includes a plurality of light source units 1 arranged in line in the auxiliary scanning direction. Specifically, the array light source 1' has a number of light source units 1 corresponding to number N of scanning lines, and is arranged and configured so that scanning lines corresponding to the number N of scanning lines are scanned while evenly spaced apart in a range from an upper end to a lower end of the scanned area. Each of the light source units 1 included in the array light source 1' emits a laser beam in a direction parallel to the central axis AX. Thus, a group of laser beams arranged and evenly spaced apart in the auxiliary scanning direction are injected into the collecting optical system 32. Such laser beams are given the f-θ characteristic, and can be deemed to be laser beams scanned in the auxiliary scanning direction.

As shown in FIG. 8, an image height in the auxiliary scanning direction of a laser beam emitted from each of the light sources 1 is defined to be z. A laser beam emitted from each of the light source units 1 makes an angle (arc $\sin(z/f_1)$) with the central axis AX on the auxiliary scanning plane, since the laser beam is given an f-sin θ characteristic corresponding to an image height z in the auxiliary scanning direction, and the laser beam enters the deflection surface 4P of the deflector for main-scanning 4. Subsequently, the laser light is emitted from the deflection surface 4P of the deflector for auxiliary scanning 4 while making the angle (arc $\sin(z/f_1)$) with the central axis AX on the auxiliary scanning plane, and enters the scanning optical system 5. Since the laser beam is further given the f-sin θ characteristic by the scanning optical system 5, an image height z' of the laser beam on the screen S in the auxiliary scanning direction becomes $f_2 \cdot \sin(\text{arc }\sin(z/f_1))$, i.e., $z \cdot f_2/f_1$ which is proportional to the image height z. Namely, the f-sin θ characteristic of the laser beam is cancelled out in the auxiliary scanning direction, and only the f-θ characteristic remains. On the other hand, laser beams emitted from the respective light source units 1 enter the same position of the collecting optical system 32, with respect to the main scanning direction. Therefore, the f-sin θ characteristic is not given at this stage. The laser beams are given the f-sin θ characteristic by the scanning optical system 5 for the first time. In this manner, the two-dimensional scanning optical device 100 of the third embodiment also has a configuration which reduces a production cost, similarly as the first or second embodiment. At the same time, the two-dimensional scanning optical device 100 of the third embodiment can scan in such a way that distances between the scanning lines are equal, while removing curves of the scanning lines.

These are the embodiments of the present invention. A two-dimensional scanning optical device according to the present invention is not limited to the above-described configurations, and various modifications are possible within the scope of the technical concept of the present invention. For example, as a modified example of the second embodiment, a two dimensional scanning optical device 100 can be considered such that two or more than four light source units are arranged in line in the auxiliary scanning direction.

Further, the light source units 1 can be arranged in such a way that the light source units 1 forms a plurality of lines in the main scanning direction and the auxiliary scanning direction, respectively. The light source units 1 can be arranged in such a way that three pieces of the light source units 1 are arranged in line in the auxiliary scanning direction while two pieces of the light source units 1 are arranged in line in the main scanning direction (namely, two lines of the light source units 1 arranged in the auxiliary scanning direction are arranged in line in the main scanning direction (6 pieces are arranged, in total)), as shown in FIG. 7.

Figure 9A:
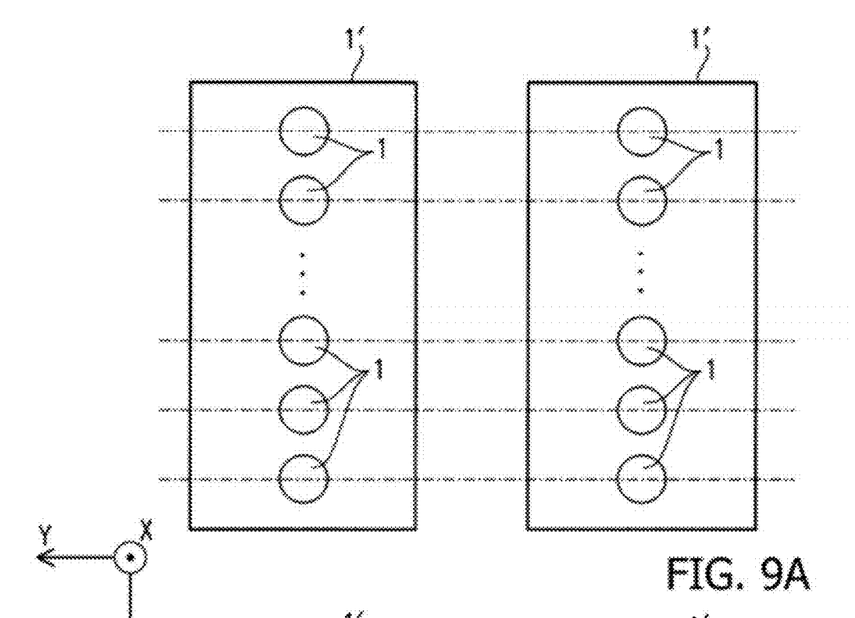
FIG. 9A and FIG. 9B are diagrams typically showing an arrangement configuration of a plurality of array light sources included in a two-dimensional scanning optical device of a modified example of the third embodiment of the present invention.
Figure 9B:
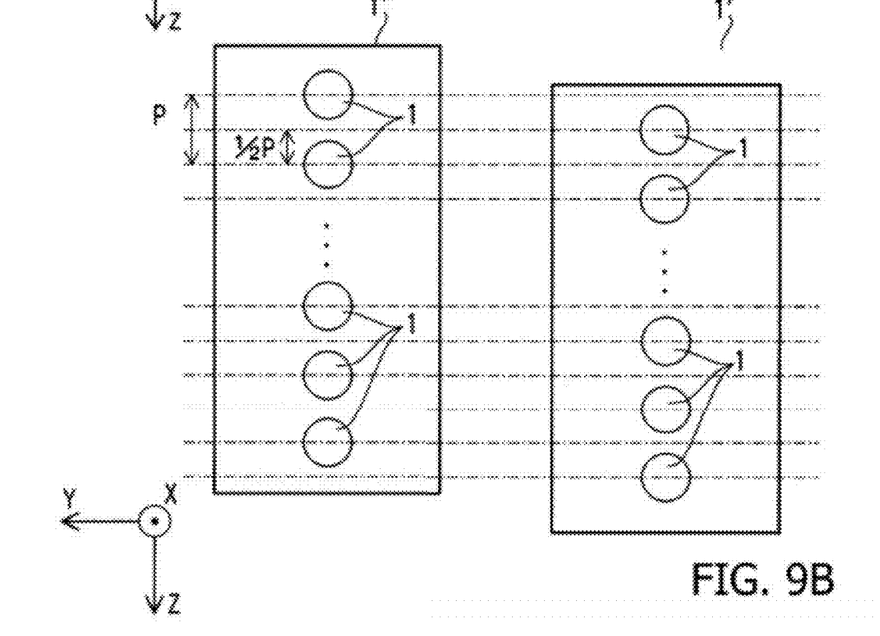
Figure 10A:
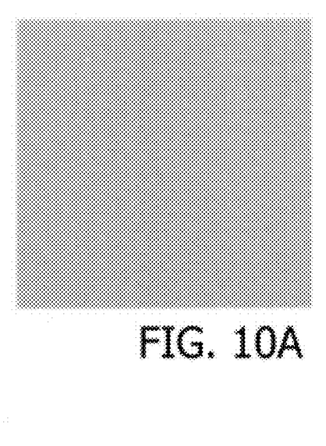
FIGS. 10A to 10D are diagrams showing samples of stripe patterns projected to the screen in the two-dimensional scanning optical device of the first embodiment of the present invention.
Figure 10B:
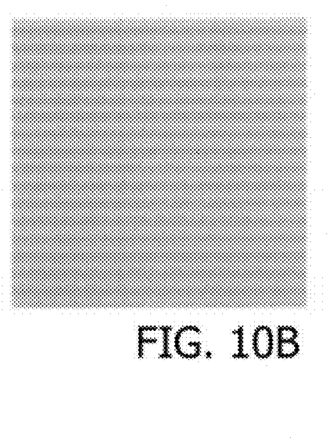
Figure 10C:
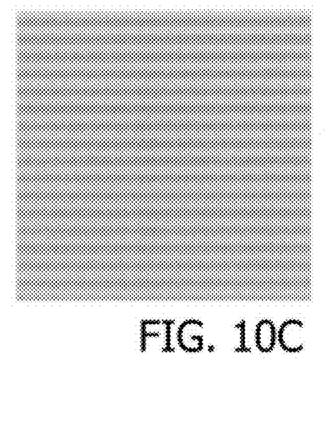
Figure 10D:
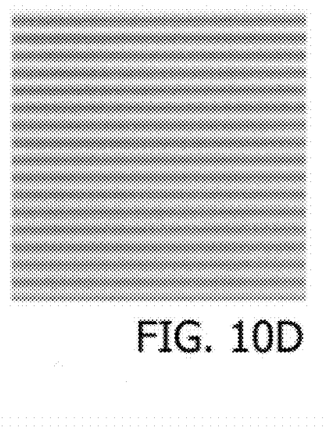

Further, as a modified example of the third embodiment, a configuration can be considered such that a plurality of array light sources 1' are arranged. In FIGS. 9A and 9B, arrangement configurations of the plurality of array light sources 1' are typically shown, respectively. According to FIGS. 9A and 9B, each of the array light sources 1' are arranged in line in the main scanning direction. To be more specific, according to FIG. 9A, the plurality of array light sources 1' are arranged such that positions of respective light source units 1 in the auxiliary scanning direction coincide. According to FIG. 9B, the plurality of array light sources 1' are arranged such that a position of each of the light source units 1 in the auxiliary scanning direction is shifted by a half of a pitch between the neighboring light source units 1 (½ P). According to the configuration shown in FIG. 9A, there is an advantage that a light intensity of each scanning line increases. According to the configuration shown in FIG. 9B, there is an advantage that a number of scanning lines increases.

Further, in the above embodiments and modified examples, it is explained that the two-dimensional scanning optical device 100 is mounted to a projector. However, the two-dimensional scanning optical device 100 can be preferably used for, for example, a printer or a image scanner.

Further, in the above embodiments and modified examples, it is configured that a single light source (a laser light source) has a single opening (1 beam per a light source of 1 chip). In another embodiment, it can be configured that a single light source (a laser light source) has a plurality of openings (multiple beams per a light source of 1 chip).

What is claimed is:

1. An scanning optical device that scans a light beam in two directions, the two directions being a main scanning direction and an auxiliary scanning direction, the optical scanning device comprising:
    at least one light source unit that emits the light beam;
    a first deflector that deflects the emitted light beam in the auxiliary scanning direction;
    a condensing optical system that generates an intermediate image of the light beam deflected by the first deflector;
    a collecting optical system that collects each chief ray corresponding each intermediate image formed by the condensing optical system;
    a second deflector that deflects the light beam collected by the collecting optical system in the main scanning direction; and
    a scanning optical system that scans the light beam, the light beam being deflected by the second deflector, on a surface to be scanned,
    wherein the condensing optical system is configured to have an f-θ characteristic, the collecting optical system is configured to have an f-sin θ characteristic, and the scanning optical system is configured to have an f-sin θ characteristic, respectively.

2. The scanning optical device according to claim 1, wherein, when the scanning optical device is configured to have a plurality of light source units, the plurality of light source units are arranged in line in at least one of the main scanning direction and the auxiliary scanning direction.

3. The scanning optical device according to claim 2, wherein, when the plurality of light source units are configured such that three or more the light source units are arranged in line in the auxiliary scanning direction, the plurality of light source units are arranged such that respective angles between optical axes of the neighboring two light source units are equal.

4. The scanning optical system according to claim 1, wherein, when the light source unit is arranged such that an optical axis of the light source unit makes an angle A with a central axis of the scanning optical system on a main scanning plane including the central axis of the scanning optical device and the main scanning direction, and when a maximum absolute value of an angle between the light beam deflected by the first deflector and the central axis on an auxiliary scanning plane including the central axis and the auxiliary scanning direction is defined as B, while a total number of scanning lines corresponding to one frame on the surface to be scanned is defined as N, a following conditional equation is satisfied:

$$1 - \frac{0.25}{N} \leq \frac{\tan B}{B} \cdot \frac{\arctan\sqrt{\tan^2 B + \left(\frac{\tan A}{\cos B}\right)^2}}{\sqrt{\tan^2 B + \left(\frac{\tan A}{\cos B}\right)^2}} \leq 1 + \frac{0.25}{N}$$

5. The scanning optical device according to claim 1, wherein deflection surfaces of the first deflector and the second deflector are arranged at optically conjugate positions by the condensing optical system and the collecting optical system.

6. A scanning optical device for scanning a plurality of scanning lines on a surface to be scanned, the scanning optical device comprising:
    a plurality of light source units for emitting light beams, the plurality of light source units being spaced evenly apart in an auxiliary scanning direction, the auxiliary scanning direction being a direction perpendicular to a main scanning direction, wherein the scanning lines are scanned in the main scanning direction;
    a collecting optical system that collects chief rays of respective emitted light beams;
    a deflector that deflects the collected respective light beams in the main scanning direction; and
    a scanning optical system that scans the light beams deflected by the deflector on the surface to be scanned,
    wherein the collecting optical system is configured to have an f-sin θ characteristic and the scanning optical system is configured to have an f-sin θ characteristic.

7. The scanning optical device according to claim 6, wherein the plurality of light source units are an array light source having a plurality of light source units that are evenly spaced apart in the auxiliary scanning direction.

8. The scanning optical device according to claim 7, wherein the scanning optical device includes a plurality of array light sources arranged in line in the main scanning direction.

* * * * *